July 18, 1961          R. P. SHEVCHENKO ET AL          2,992,842
                         OIL SCRUBBED FACE SEAL
Filed April 21, 1958                              2 Sheets-Sheet 1
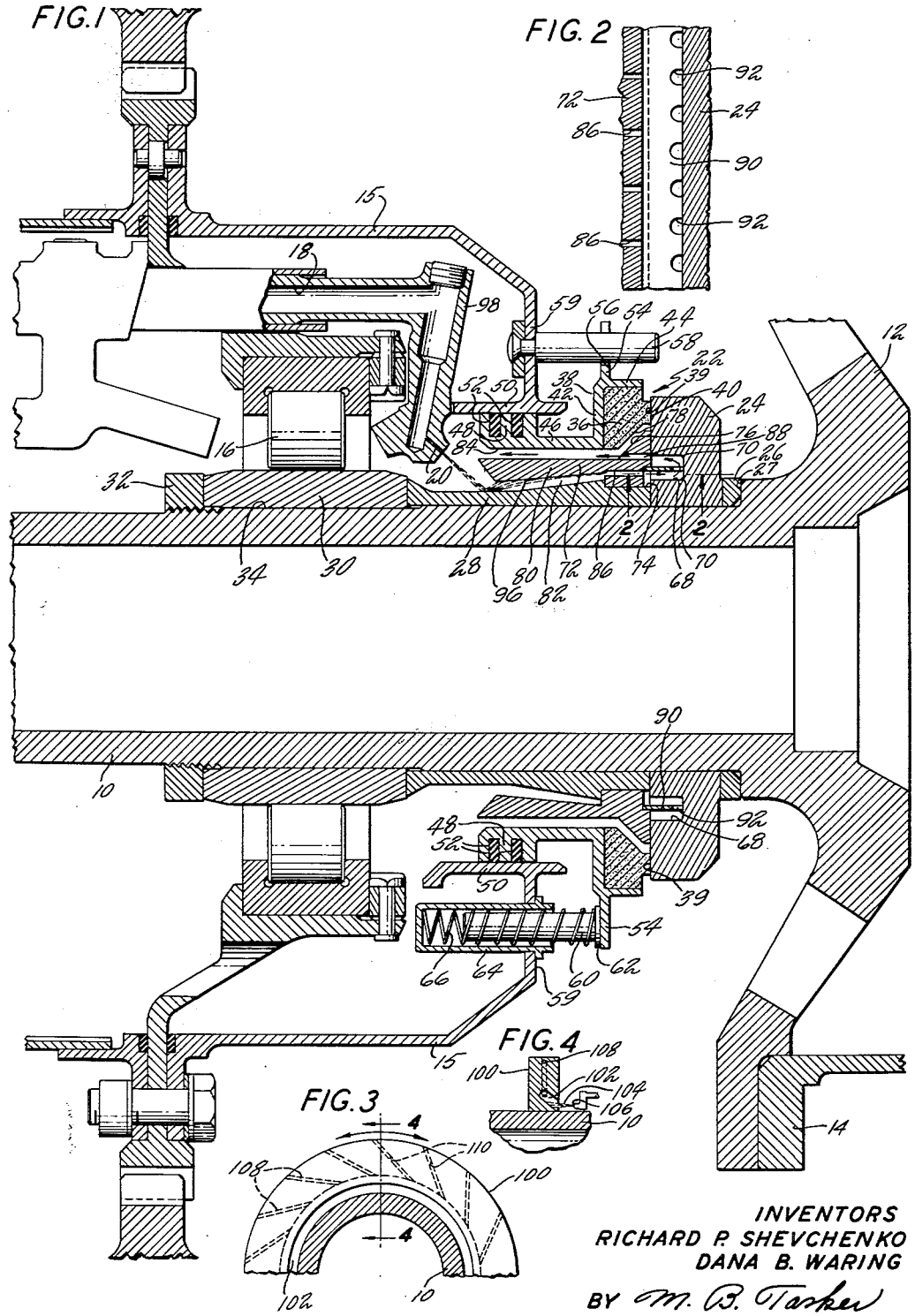
INVENTORS
RICHARD P. SHEVCHENKO
DANA B. WARING
BY *M. B. Tasker*
ATTORNEY

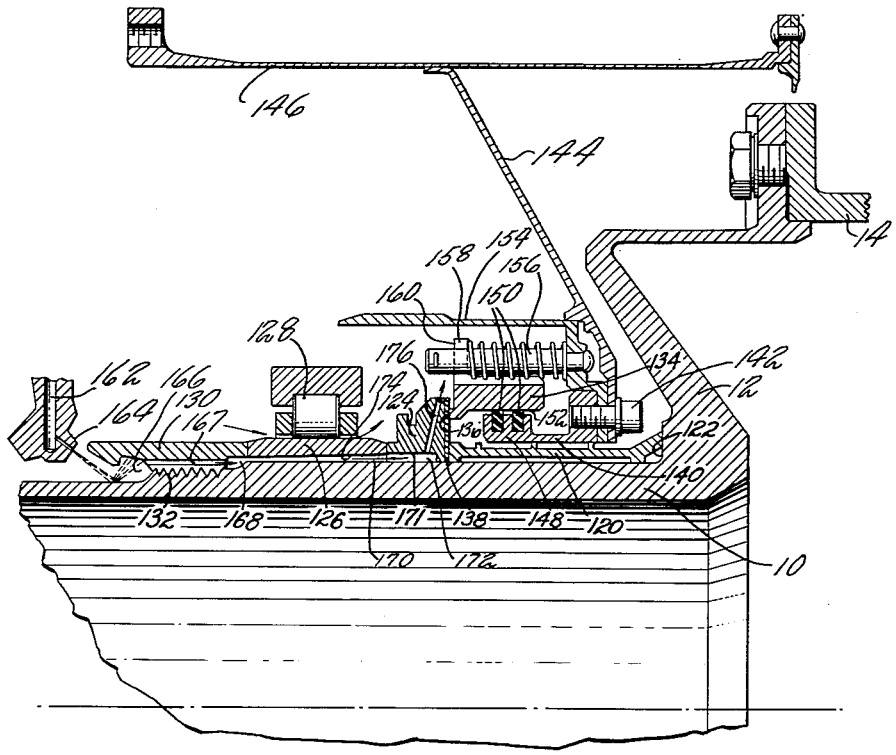

United States Patent Office 2,992,842
Patented July 18, 1961

2,992,842
OIL SCRUBBED FACE SEAL
Richard P. Shevchenko, East Hampton, and Dana B. Waring, Glastonbury, Conn., assignors to United Aircraft Corporation, East Hartford, Conn., a corporation of Delaware
Filed Apr. 21, 1958, Ser. No. 729,698
13 Claims. (Cl. 286—9)

This invention relates to cooling means for rotating members which operate in a hot environment, such for example as fluid seals, bearing races, slip rings and the like used in gas turbine engines and other high speed and high temperature rotating apparatus, although the principle involved is equally applicable to heating rotating members which run too cold.

This application is a continuation-in-part of our copending application U.S. Serial No. 557,947, filed January 9, 1956, now abandoned.

It is a principal object of this invention to provide improved cooling or heating means for such devices and a method by which a thin film of high velocity cooling or heating fluid is caused to flow in intimate contact with a surface of the member the temperature of which is to be controlled.

Another object of the invention is to provide a construction whereby an increased surface area of the heated member is traversed by the cooling fluid film and the two are brought into more intimate contact.

Still another object of this invention is to provide means for scrubbing a high velocity film of cooling fluid over a surface of a rotating member to be cooled under the action of centrifugal force.

A further object of this invention is to provide such a surface on a member to be cooled which is transverse to the direction in which centrifugal forces acts and against which surface a cooling liquid is held by centrifugal force to provide a high pressure scrubbing of the surface by the liquid.

A further object of the invention is generally to improve the construction and operation of frictionally engaging high speed rotating members.

These and other objects and advantages of the invention will be specifically pointed out in the following detailed description of a preferred embodiment of the invention as applied to a fluid seal for a gas turbine engine illustrated in the accompanying drawing.

In this drawing:

FIG. 1 is a longitudinal sectional elevation of a portion of a gas turbine engine illustrating a seal assembly constructed in accordance with this invention;

FIG. 2 is a sectional detail on line 2—2 of FIG. 1;

FIG. 3 shows as a modification a rotating member cooled in accordance with the principles of this invention;

FIG. 4 is a section taken on line 4—4 of FIG. 3; and

FIG. 5 is a longitudinal sectional elevation of a portion of a gas turbine engine in which a bearing race and a face seal are cooled.

As herein shown, 10 is the main shaft connecting the compressor of a gas turbine engine with the turbine, only the hub 12 and a section of one turbine disc 14 of the turbine being shown. Surrounding shaft 10 is a supporting casing 15 which encloses a portion of the shaft and houses a roller bearing 16 for the shaft and an oil tube 18 for conducting cooling fluid under pressure to a nozzle 20 which directs the cooling fluid to a seal, generally indicated at 22, located between shaft 10 and the supporting housing 15 and with which this invention is particularly concerned.

Seal 22 comprises an annular seal plate 24 which is carried by shaft 10 and rotates with it. The seal plate is fixed on the shaft against a spacer ring 26 which abuts a shoulder 27 on hub 12. A sleeve 28 on shaft 10 at one of its ends abuts the seal plate 24 and at its other end abuts a bearing inner race 30 for roller bearing 16. This shaft assembly is held in place by a nut 32 which is threaded on a slightly enlarged portion 34 of the shaft, on which members 30, 28, 24 and 26 are located in the order named, and bears against the exposed end of bearing inner race 30.

Cooperating with the rotatable seal plate 24 is an annular carbon type seal 36 mounted on an annular, flanged seal supporting member 38 so that an annular face 40 of the nonrotatable seal engages the confronting face 39 of seal plate 24. Member 38 includes, in addition to a radial backing plate 42 and a right angle flange 44 which support the seal, a cylindrical portion 46 which is coaxial with shaft 10 and terminates in an annular, external thickened ring 48 which slides within a tubular coaxial seal housing 50 on casing 15 much as a piston slides in a cylinder. Suitable annular seal rings 52 are provided in radial grooves in ring 48 which engage with housing 50. It will thus be evident that seal supporting member 38 is free to move axially to the right or left (FIG. 1) as its supporting ring 48 slides within the seal housing 50 to bring the annular seal face 40 into contact with face 39 of seal plate 24.

Means are also provided for holding the seal supporting member 38 against rotation while permitting the above-described axial movement thereof relative to the seal plate. To this end, member 38 is provided with a radial flange 54 which has a plurality of spaced peripheral holes 56 designed to receive a plurality of stationary horizontal pins 58 arranged in a circle on a vertical wall 59 of casing 15. Also arranged in the same circle on wall 59 of casing 15 and alternating with the pins 58 are a plurality of pins 60 provided with pads 62 on their extremities which engage the radial flange 54 between holes 56. These pins 60 are axially reciprocable in a series of tubular housings 64 mounted in casing 15. The tubular housings 64 are sufficiently larger in diameter than the diameter of pins 60 to receive compression springs 66 therein which surround the pins. One end of each spring 66 engages the closed end of its tubular housing 64 while the other end engages the pad 62 formed integral with the pin, with the result that pins 60 are constantly urged out of the housings 64 against flange 54 to press seal 36 into engagement with seal plate 24.

Seal 22 is exposed to the turbine cooling air which is at a high temperature. Also, due to the high speed of rotation of seal plate 24 relative to the nonrotating seal 36, considerable heat is generated in the seal plate and the seal itself which must be dissipated. Accordingly, means are provided for transferring heat from the seal plate 24 at such a high rate that the cooperating frictionally engaging seal and seal plate are maintained at a safe temperature.

In accordance with this invention the seal plate 24 has a re-entrant portion in the form of an annular groove 68 cut in the seal engaging face 39 thereof. The bottom of the groove is cut with rounded corners 70 to provide a smooth flow path for a transversely directed stream of fluid entering the open side of the groove as it passes over the internal surfaces of the groove.

Means are provided which include a scoop 72 for directing a thin film of very high velocity cooling fluid over the internal surface of groove 68. Scoop 72 is mounted on a reduced diameter portion 74 of sleeve 28 adjacent face 39 of the seal plate and includes an annular portion that terminates at its outer diameter in a beveled face 76 which overlies and is slightly spaced from a corresponding beveled face 78 on the stationary seal. The annular space between the rotating sleeve 28 and the cylindrical portion 46 of the nonrotating seal supporting member 38 is divided by an annular spacer sleeve 80 formed integral with the annular portion of the rotating scoop 72 so that inner and outer annular passages 82 and 84 are provided. These passages communicate with groove 68 by two sets of annularly arranged holes formed in the annular portion of scoop 72. Thus, passage 82 communicates with the groove through a series of annularly arranged holes 86 which are located so as to direct fluid along the wall of groove 68. Passage 84 communicates with groove 68 through a series of annularly arranged holes 88 which are located so that an annular film of fluid flowing along the outermost side wall of groove 68 will be aligned with these holes.

A cylindrical baffle member 90 is located in groove 68 in approximately the middle of the groove which is provided with a plurality of closely spaced marginal slots 92 in that extremity of the baffle which is seated in the bottom of groove 68, these slots being U-shaped, radial slots as shown most clearly in FIG. 2. Baffle member 90 is mounted at its left-hand end, as viewed in FIG. 1, by being pressed onto a shoulder on the annular portion of scoop 72 between the two rows of holes 86 and 88. It will thus be evident that a path is provided for the cooling fluid comprising annular passage 82, holes 86, the inner half of groove 68, slots 92, the outer half of groove 68, holes 88 and annular passage 84.

In order to effect a very high velocity flow through the passageway above-outlined, the centrifugal head of the rotating fluid in the passage is utilized. It will be noted that sleeve 80 has an inner annular surface 96 which is inclined outwardly toward holes 86. Due to the high speed of rotation of the turbine shaft, a high centrifugal head is imparted to any fluid in the inclined passage 82 which causes fluid therein to flow along the inclined surface 96 at high velocity without putting it under pressure.

Fluid is introduced into passage 82 from the supply conduit 18 through an angularly related passage 98 leading to nozzle 20.

In operation, the cooling fluid discharged from nozzle 20, which may be oil, enters annular passage 82 in the form of a jet and is rotated at the high speed of rotation characteristic of gas turbine engines. It will be understood that sleeve 28, together with the oil scoop 72, which includes the spacer sleeve 80 and baffle 90, are all rotating at turbine speed as well as the seal plate 24 which has the groove 68 formed therein. The high centrifugal head generated by the rotating oil in outwardly inclined passage 82 forces the cooling oil to flow at a high velocity over the surface 96, and through the holes 86. This velocity, which may be several thousand feet per second, causes the oil to pass over the surface 96, through holes 86, over the surface of groove 68 and in a thin film, estimated to be only .003″ to .005″ thick, into the outer annular passage 84.

It will be evident that the cooling oil will be evenly distributed around groove 68 as it enters at very high velocity through holes 86. As the oil flows smoothly at high velocity over the sides and the bottom surfaces of the groove it comes into very intimate contact with these surfaces, producing in effect a scrubbing of the surfaces. The even distribution of the oil film in the groove is further assured by its passage through slots 92 of which, in the structure shown, there are 96 in number. As the film of oil flows along the outer wall of the groove 68, centrifugal force further urges it into pressure contact with the wall of the groove. The oil, after passing through holes 88 in the cylindrical portion of oil scoop 72, then flows through annular passage 84, further cooling spacer sleeve 80 and seal supporting member 38. Since the oil scoop 72 is in contact with seal plate 24 over a considerable part of the face 39 thereof, it will be evident that considerable heat will be transferred to the oil scoop and hence to the circulating oil.

Scrubbing of the thin oil film moving at such high velocity over the surface of the scoop and seal plate achieves a heat transfer far beyond that of previous cooling means by which jets of oil were used. Analysis indicates that the oil film coefficient of thermal conductivity exceeds that of the best metal it would be possible to use to transfer the heat from the seal face to the oil.

It should be noted that applicants obtain this forced scrubbing of the surfaces to be cooled with a free-flowing stream of cooling fluid as contrasted with a stream under pressure which must necessarily completely fill the cooling passages. Such a pressure stream leads to the undesirable formation of a stagnant boundary layer in contact with the surfaces to be cooled which insulates these surfaces from the cooling stream.

FIGS. 3 and 4 illustrate the manner of cooling any rotating member which may be located within the turbine casing 15 where it is exposed to the hot turbine cooling air. In this figure, annular rotating member 100, which is rotated at turbine shaft speed, is formed with an internal groove 102 into which a jet 104 of cooling fluid, as oil, is introduced through a nozzle 106. Oil in groove 102 is urged by centrifugal force through a plurality of passages 108 which extend from groove 102 through member 100 and terminate at the circumference of the latter where the oil is discharged. Passages 108 are not radial but extend transverse to the radial planes of member 100 so that as the latter rotates the oil is forced against the outer sides 110 of the passages to effect a high velocity scrubbing action on the side walls of these passages. This results in removing heat from member 100 at a much higher rate than would result from a radial flow of oil.

In FIG. 5, a modified seal construction is shown in which the same film of high velocity cooling oil which cools the seal is also used to cool an adjacent bearing race. In this modified construction the main shaft 10 supports a spacer sleeve 120 which abuts a shoulder 122 formed by hub 12 at one end and an annular seal plate 124 at its other end. The opposite end of the annular seal plate abuts the inner race 126 of a roller bearing 128. A sleeve, or nut, 130 threaded onto shaft 10 at 132 clamps the bearing race 126, seal plate 124 and spacer 120 against shoulder 122 and is itself staked to shaft 10 by suitable means (not shown) to prevent rotation.

An annular nonrotating seal member 134 has an annular seal face 136 which constantly engages a wear plate 138 on seal plate 124. Member 134 is supported for axial movement by an annular flange 140 which is secured at its base by a series of studs 142 to web 144 of an outer supporting casing 146. Flange 140 terminates in an enlarged rim 148 which carries embedded annular sealing rings 150 which bear against and are free to slide axially over a uniform diameter inner surface portion 152 of seal member 134. A cup-shaped housing 154 having its bottom wall clamped between web 144 and flange 140 encloses the seal structure. An annular series of pins 156 carried by the bottom wall of housing 154 project through peripheral slots 158 in a radial outstanding flange 160 on seal member 134 and serve to position the seal member against rotation while permitting it to be constantly biased by compression springs on pins 156 against the cooperating seal plate 124.

Cooling oil is introduced through a passage 162 leading to a nozzle 164 which directs a limited quantity of cooling fluid into an annular chamber 166 formed on the inside surface of sleeve, or nut, 130. Nut 130 has a number of axial holes 167 which direct the cooling oil into an annular chamber 168. From chamber 168 the oil flows through a plurality of axial grooves, or slots, 170 in the inner surface of bearing race 126 and into annular chamber 172 formed by a recess in the base of seal plate 124. It will be noted that the bottom surfaces 174 of grooves 170 and the bottom 171 of chamber 172, while they form continuous surfaces, are not parallel with the outer surface of shaft 10 but that surfaces 174, and if desired surface 171, are slightly inclined outwardly from the shaft axis in a direction toward the seal plate. Due to the very high speeds encountered in gas turbine engines, this inclination of the flow passages causes the fluid discharged from nozzle 164 to be directed by centrifugal force in a thin film at very high velocity over the surfaces 174 and 171 with a scrubbing action. Seal plate 124 is further cooled by the passage of fluid through a plurality of oblique passages 176 extending from chamber 172 through the seal plate and discharging the fluid at the seal plate periphery. Due to the inclination of these passages out of the radial plane of shaft 10, the cooling fluid is caused to scrub forcibly one side of these passages as it moves along the passages. Only enough fluid is admitted to chamber 166 to provide a thin film of rapidly moving fluid through the cooling passages wherein, due to the high centrifugal forces present, the scrubbing action takes place which greatly enhances the cooling effect. By reason of this rapidly moving thin film of cooling fluid which is held in intimate contact with the surfaces to be cooled, a much greater cooling effect takes place than is possible if a solid jet of cooling fluid is circulated through the passages.

It will be evident that as a result of this invention it is possible to cool relatively rotating members within a gas turbine engine casing, such as the cooperating frictionally engaging members which form the seal between the rotating shaft and the nonrotating casing or the main bearings much more effectively than has hitherto been possible.

Further, by following the teachings of this invention, it is possible to provide adequate cooling of the engine parts with a very much smaller flow of cooling oil than was hitherto required. This results in smaller passages, less pump capacity, and a smaller volume of oil, all of which results in an appreciable saving in weight.

While the invention has been illustrated and described in connection with an oil seal and a bearing race, it will be evident that it is equally applicable to a bearing cage or to cool intershaft slip rings and the like. Also, although only three embodiments of the invention have been shown, it will be understood that other embodiments are possible and various changes may be made in the construction and arrangement of the parts within the scope of the invention.

We claim:
1. In combination, a rotatable shaft, a casing through which said shaft extends, an annular seal carried by said casing, an annular seal engaging member rotatable with said shaft having an annular re-entrant portion therein adjacent the portion thereof which engages said seal, and means for cooling said seal member including centrifugal means for directing an annular stream of high velocity cooling fluid along said shaft and into said re-entrant portion of said member, said centrifugal means also including annular baffle means extending into said re-entrant portion and rotating with said seal engaging member for directing said high velocity fluid stream into intimate contact with the surfaces of said re-entrant portion over a U-shaped path.

2. In combination, a rotatable shaft, a casing surrounding said shaft, a fluid seal between said casing and shaft including a seal plate rotatable with said shaft having an annular groove in a lateral face thereof and a cooperating seal member carried by said casing having an annular seal face engaging said lateral face of said seal plate adjacent the groove therein, and scoop means rotatable with said shaft including a cylindrical baffle extending into said groove for establishing a high velocity stream of cooling fluid over the U-shaped path defined by said baffle and the surface of said groove, and means for supplying fluid to said scoop means.

3. In combination, a rotatable shaft, a casing surrounding said shaft, a fluid seal between said casing and shaft including a seal plate rotatable with said shaft having an annular groove in a lateral face thereof and a cooperating seal member carried by said casing having an annular seal face engaging said lateral face of said seal plate adjacent the groove therein, and means for establishing a high velocity flow of cooling fluid in intimate contact with the surface of said groove including a fluid scoop rotatable with said shaft and a cylindrical baffle rotatable with said scoop and extending into said groove, the end of said baffle which is within said groove terminating adjacent the bottom of said groove and having a series of marginal slots spaced about its periphery.

4. In combination, a rotatable shaft, a casing surrounding said shaft, a fluid seal between said casing and shaft including a seal plate rotatable with said shaft having an annular groove in a lateral face thereof and a cooperating seal member carried by said casing having an annular seal face engaging said lateral face of said seal plate adjacent the groove therein, and means for establishing a high velocity flow of cooling fluid in intimate contact with the surface of said groove including a fluid scoop rotatable with said shaft having a hub overlying said groove, a cylindrical baffle rotatable with said shaft extended into said groove and dividing the latter into communicating inner and outer passages, a series of lateral holes in said hub providing fluid communication between said scoop and the inner passage of said groove, and a series of holes in said hub providing fluid communication with the outside passage of said groove.

5. In combination, a rotatable shaft, a casing enclosing at least a portion of said shaft, a seal plate rotatable with said shaft having an annular groove in one face thereof, an annular seal member supported by said casing concentric with said shaft having a seal face engageable with the grooved face of said seal plate adjacent said groove, means biasing said seal member for axial movement relative to said shaft to urge said annular face against said seal plate, means for directing a high velocity flow of cooling fluid over the surfaces of said groove comprising scoop means rotatable with said shaft, said scoop means including an annular hub portion overlying the groove in said seal plate and having inner and outer series of annularly arranged holes communicating with said groove, a cylindrical baffle carried by said hub portion between said inner and outer series of holes and extended into said groove, thus dividing said groove into two communicating parts, and an annular outwardly flared passage surrounding said shaft having its outermost end communicating with said inner series of holes in said hub portion, and means for introducing cooling fluid into said flared passage.

6. In combination, a rotatable shaft, a casing enclosing at least a portion of said shaft, a seal plate rotatable with said shaft having an annular groove in one face thereof, a seal member supported by said casing concentric with said shaft having an annular seal face engageable with the grooved face of said seal plate adjacent said groove, means for biasing said seal member for axial movement relative to said shaft to urge said annular face against said seal plate, means for directing a high velocity flow of cooling fluid over the surfaces of said groove comprising scoop means rotatable with said shaft, and a cylindrical baffle carried by said scoop means and extended into said groove in spaced relation to the side walls thereof, said cylindrical baffle having its extended end terminating adjacent the bottom of said groove and having a plurality of spaced marginal slots formed therein for establishing fluid communication between portions of said groove divided by said baffle.

7. In combination, a rotatable shaft, a casing enclosing at least a portion of said shaft, a seal plate rotatable with said shaft having an annular groove in one face thereof, a seal member supported by said casing concentric with said shaft having an annular seal face engageable with the grooved face of said seal plate adjacent said groove, means for biasing said seal member for axial movement relative to said shaft to urge said annular face against said seal plate, means for directing a high velocity flow of cooling fluid over the surfaces of said groove comprising scoop means rotatable with said shaft, said scoop means including an annular hub portion overlying said groove in the face of said seal plate and having inner and outer series of annularly arranged holes aligned with the inner and outer walls of said groove, a cylindrical baffle carried by said hub portion between said series of holes and extended into said groove and terminating adjacent the bottom of the latter so that the two parts of said groove are in communication, an annular spacer sleeve carried by said hub between said series of holes and extending along said shaft in the opposite direction to said baffle, said spacer sleeve having its inner wall confronting said shaft outwardly flared toward said hub, and means for introducing cooling fluid into the space between said spacer sleeve and said shaft.

8. In combination, a rotatable shaft, a casing through which said shaft extends, an annular seal plate rotatable with said shaft having an annular groove in one face thereof, an annular seal supporting member carried by said casing and axially movable relative thereto, a seal member carried by said supporting member having an annular face engageable with the grooved face of said seal plate adjacent said groove, means for biasing said seal supporting member axially to urge said annular seal face into sealing engagement with said seal plate, means for directing a high velocity flow of cooling fluid over the surface of said groove comprising scoop means rotatable with said seal plate, and means for establishing a U-shaped passageway for a stream of cooling fluid into and out of said groove including inner and outer series of annularly arranged holes in said scoop means which are aligned with the inner and outer walls of said groove, a cylindrical baffle mounted on said scoop means between said inner and said outer series of holes and extended into said groove and terminating adjacent the bottom wall thereof so that the two parts of said groove are in communication, and a spacer sleeve between said series of holes extended on the other side of said scoop means from said baffle, said spacer sleeve having its inner wall adjacent said shaft obliquely inclined inwardly toward its extremity to provide an outwardly flared scoop passage leading from said extremity to said inner series of holes, and means for introducing fluid under pressure into said flared passage between said spacer sleeve and said shaft.

9. In combination, a rotatable shaft, a casing enclosing at least a portion of said shaft, a seal plate rotatable with said shaft having an annular groove in one face thereof, a sleeve on said shaft abutting said seal plate having its outer surface flared outwardly toward said seal plate, a scoop having a hub portion mounted on said sleeve adjacent said seal plate and overlying said groove, sets of inner and outer annularly arranged series of holes in said hub portion communicating with said groove, a cylindrical baffle carried by said hub portion and extended into said groove substantially midway between the inner and outer walls thereof, said baffle terminating adjacent the bottom surface of said groove and having a series of marginal slots adjacent said bottom surface, a spacer sleeve carried by said hub portion between said series of holes and extended in the opposite direction to said baffle, said spacer sleeve having an oblique inner wall generally parallel with the flared wall of said first-mentioned sleeve, and means for introducing cooling fluid under pressure between said sleeves.

10. In combination, a rotatable shaft, a casing enclosing at least a portion of said shaft, a seal plate carried by said shaft having an annular groove in one face thereof, a cylindrical wall on said casing concentric with said shaft, an annular seal supporting member axially movable along said wall, a seal member carried by said seal supporting member having an annular seal face engageable with the grooved face of said seal plate adjacent the groove therein, means for holding said seal supporting member against rotation, means carried by said casing for constantly biasing said seal supporting member in a direction to hold said annular seal face against said seal plate, a sleeve carried by said shaft adjacent said seal plate having an annular outer wall flared outwardly toward said groove, a scoop rotatable with said shaft having a hub portion provided wtih inner and outer series of annularly arranged holes which are aligned substantially with the inner and outer walls of the groove, a cylindrical baffle carried by said hub portion and extended into said groove substantially midway between the inner and outer walls thereof, thus dividing said groove into two communicating parts, an annular spacer sleeve also carried by said hub portion and extended therefrom in a direction opposite to said baffle, said spacer sleeve being located between said cylindrical wall on said casing and said first-mentioned sleeve on said shaft and having its inner surface confronting the flared surface on said sleeve and generally parallel therewith, and means for introducing a cooling fluid into the space between said sleeves.

11. The method of cooling a rotating member which consists in directing a free-flowing stream of cooling fluid at high velocity over a heated surface of said member which is inclined with respect to the direction of flow of fluid therealong under the action of centrifugal force, and causing said fluid to flow in a thin film over said surface in intimate contact therewith by limiting the quantity of fluid directed onto said surface.

12. The method of cooling a rotating member which consists in directing a free-flowing stream of cooling fluid at high velocity over a surface which is inclined with respect to the axis of rotation of said member, and limiting the volume of fluid directed over said surface to cause the fluid to flow in a thin film at very high velocity over a heated surface of said member which is at an angle to the normal path in which said fluid tends to flow by centrifugal force, whereby the fluid film is caused to forcibly scrub the heated surface and increase the rate of heat conduction from said member.

13. In combination, a rotatable shaft, a casing through which said shaft extends, a member rotatable with said shaft having a surface to be cooled, and means for passing a free-flowing solid film of cooling fluid preferably between .003 and .005 inch thick over said surface at very high velocity, said means comprising a pumping member rotatable with said shaft having a surface thereon confronting said shaft which is inclined outwardly with respect to the surface of said shaft and is located so as to transfer said cooling stream onto said surface to be cooled, and means for introducing only enough cooling fluid between said shaft and said inclined surface to maintain said fluid film on said surfaces.

References Cited in the file of this patent
UNITED STATES PATENTS

| | | |
|---|---|---|
| 1,243,712 | Clark et al. | Oct. 23, 1917 |
| 2,679,412 | Whitfield | May 25, 1954 |
| 2,801,117 | Bourgeois et al. | July 30, 1957 |
| 2,820,653 | Yokel | Jan. 21, 1958 |
| 2,835,514 | McGahan | May 20, 1958 |
| 2,857,182 | Bain et al. | Oct. 21, 1958 |